E. L. BOTTS & D. LUCAS.
ATTACHMENT FOR POTATO DIGGING MACHINES.
APPLICATION FILED DEC. 8, 1909. RENEWED OCT. 24, 1910.
992,936.
Patented May 23, 1911.
2 SHEETS—SHEET 2.
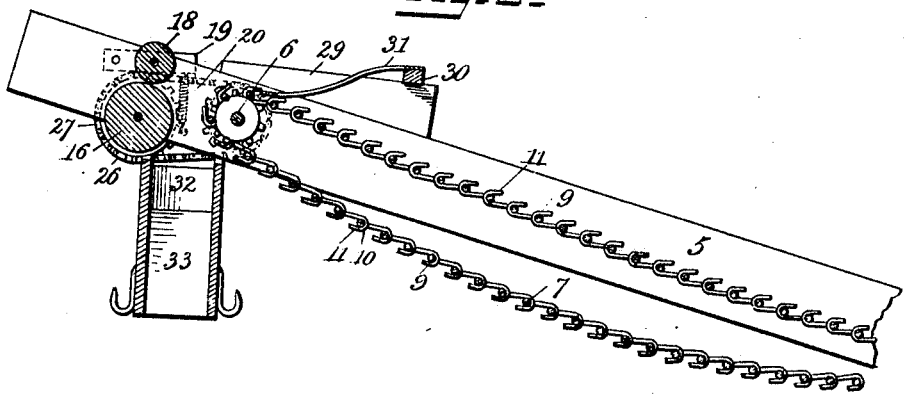
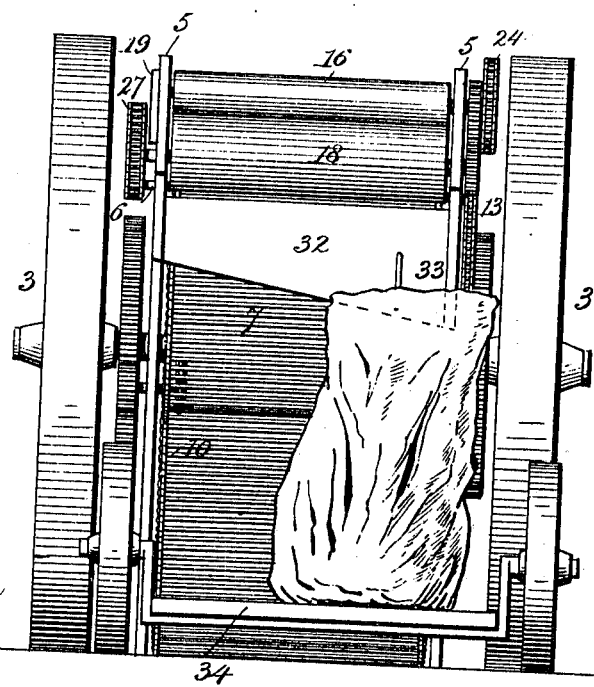
Witnesses
F. L. Durand
C. H. Griesbauer
Inventors
Elmer L. Botts
Daniel Lucas
by H. B. Willson & Co.
Attorneys

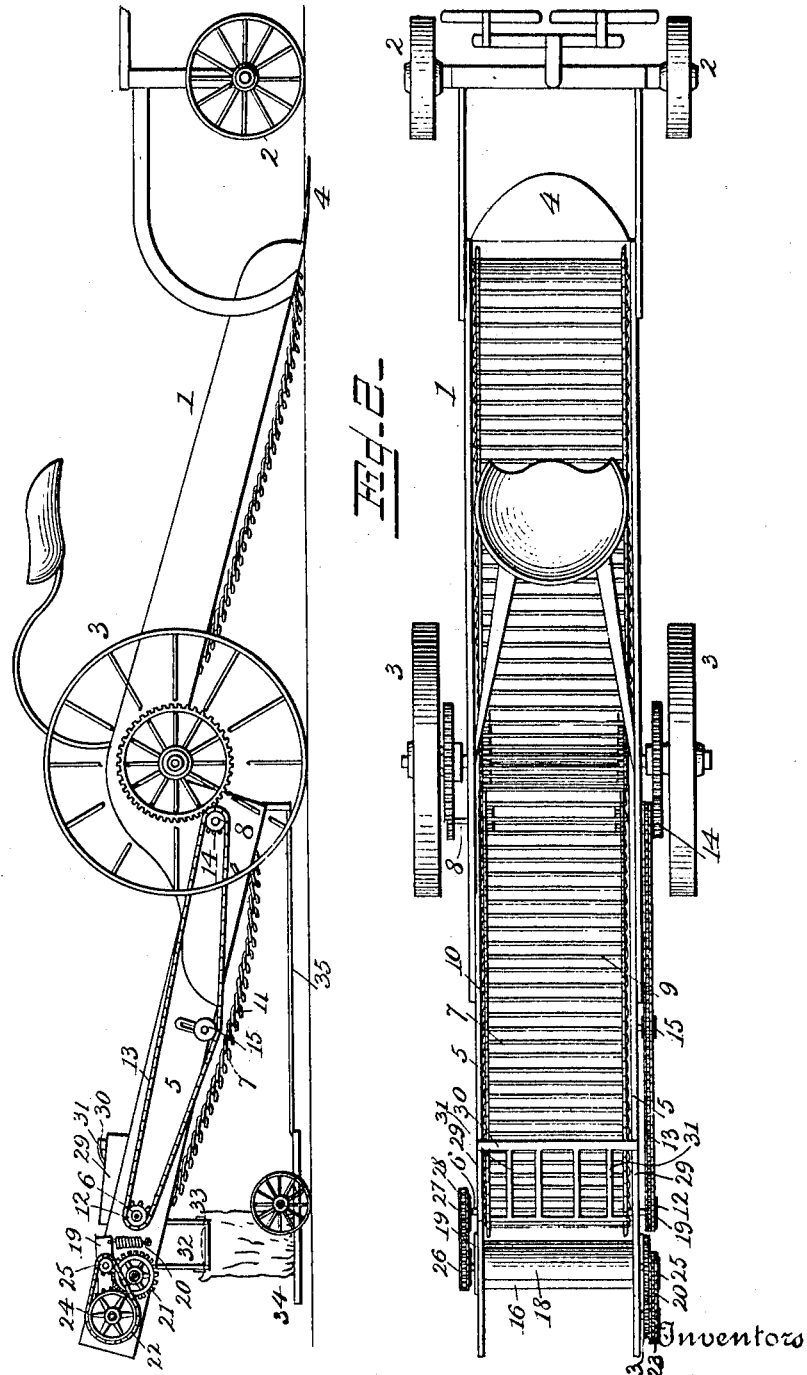

UNITED STATES PATENT OFFICE.

ELMER L. BOTTS AND DANIEL LUCAS, OF FRAZEE, MINNESOTA.

ATTACHMENT FOR POTATO-DIGGING MACHINES.

992,936.            Specification of Letters Patent.     Patented May 23, 1911.

Application filed December 8, 1909, Serial No. 531,958. Renewed October 24, 1910. Serial No. 588,901.

*To all whom it may concern:*

Be it known that we, ELMER L. BOTTS and DANIEL LUCAS, citizens of the United States, residing at Frazee, in the county of Becker and State of Minnesota, have invented certain new and useful Improvements in Attachments for Potato-Digging Machines; and we do declare the following to be a full, clear, and exact description of the invention, such as will enable others skilled in the art to which it appertains to make and use the same.

This invention relates to a picking, separating, and bagging attachment for potato digging machines.

The object of the invention is to provide an attachment of this character by means of which the potatoes will be separated from the dirt and vines after they are lifted by the machine and having means whereby any potatoes hanging to the vines will be picked off and discharged into a suitable hopper and from thence discharged into bags provided to receive them.

With this and other objects in view, the invention consists of certain novel features of construction, combination and arrangement of parts as will be more fully described and particularly pointed out in the appended claims.

In the accompanying drawings: Figure 1 is a side view of a potato digging machine showing the invention applied thereto. Fig. 2, is a top plan view of the same. Fig. 3, is a central vertical longitudinal sectional view, and, Fig. 4, is a rear view.

Referring more particularly to the drawings, 1, denotes a potato digging machine, which may be of any suitable construction and is here shown as being provided with front and rear pairs of supporting wheels 2 and 3, and a digging blade or shovel 4.

In carrying out our invention, we provide a supplemental frame comprising guide boards 5, the forward ends of which are bolted or otherwise secured to the side pieces of the machine as shown. The frame boards 5, project upwardly at a suitable angle and between the same near their upper ends is revolubly mounted an upper conveyer shaft 6, with which is operatively engaged the upper portion of an endless conveyer apron 7. The conveyer apron 7, passes around a lower conveyer shaft 8, in the lower portion of the boards 5, or in the frame of the machine.

The conveyer apron 7, is here shown and preferably consists of a series of transversely disposed rods or bars 9, the opposite ends of which are bent rearwardly at right angles to the bars as shown at 10, and said angularly bent ends are then bent or folded upon themselves to form hooks 11. In assembling the bars to form the conveyer apron, the hooks 11 of one bar are engaged with the next bar adjacent to its angularly bent ends, thus forming a succession of connected bars which constitute the conveyer apron. The shafts 6 and 8, are preferably provided with suitable cog wheels which engage the bars of the apron. The shaft 6, at the upper end of the conveyer is provided on one end with a sprocket gear 12, which is engaged by a sprocket chain 13. The chain 13, is also engaged with a sprocket gear 14, arranged at one end of the shaft 8, whereby the motion of the axle is transferred to the conveyer to operate the same in the proper direction. The chain 13 is held at the proper tension by a chain tightening pulley 15, arranged on the side of the frame as shown.

In the upper end of the attachment between the boards 5, is revolubly mounted a lower stationary potato picking roll 16, said roll being mounted in stationary bearings in the side boards 5 of the frame. Adapted to co-act with the roll 16 is an upper picking roll 18, said upper roll being mounted in bearing plates 19, which are pivotally connected to the outer sides of the boards 5, as shown. The upper roll 18 is held down in operative engagement with the lower roll by coil springs 20, which are connected to the ends of the plates 19, and to the outer side of the boards 5, as shown. By thus yieldingly mounting the upper roll, the latter will give to permit large bunches of vines passing between the rolls thus preventing the machine from becoming clogged.

On one end of the roll 16, adjacent to the outer side of the boards 5, is a spur gear wheel 21 which engages a combined spur and sprocket gear 22, the sprocket teeth 23 of which are connected by a sprocket chain 24 to a sprocket pinion 25 fixedly mounted on the adjacent end of the upper roll 18. On the opposite end of the shaft of the roll 16 is mounted a sprocket gear 26, which is engaged by the sprocket chain 27 of a sprocket gear 28, fixedly mounted on the adjacent end of the shaft 6, whereby said picking rolls are driven. By providing the rolls 16 and 18, the vines when brought up to the upper end of the frame by the conveyer apron 7, will be caught by the rolls and drawn therethrough, thus snapping or picking the potatoes off from the vines. The potatoes when thus snapped off from the vines will drop down through a space between the rolls and the upper ends of the conveyer apron and will fall into a suitable hopper hereinafter described. The vines after passing between the rolls are discharged from the rear end of the machine. The potatoes which are loose or free from the vines when dug are also elevated by the conveyer and discharged at the upper end of the same and also fall into the hopper.

Arranged on the opposite sides of the frame and secured to the upper edges of the side boards 5, are extension boards 29. Secured to the upper edges of the side boards 29 is a cross strip 30, to which is secured a series of downwardly projecting curved spring guide rods 31, in which the vines elevated by the conveyer are brought into engagement. The rods 31, serve to straighten out and direct the vines between the rolls. Secured to the lower edges of the side boards 5, below the passage between the rolls and the upper end of the conveyer is a potato receiving hopper 32, having a bottom inclined toward one side of the attachment and provided on one end with a chute 33, to which the upper end of a bag is adapted to be attached to receive the potatoes falling from the hopper. The bag, while being filled from the hopper 32 and chute 33, is preferably supported upon the platform of a two-wheel truck 34, which is provided with a tongue or other suitable draft device 35, by means of which it is connected to a suitable part of the machine and is drawn along beneath or alongside of the rearwardly projecting separating attachment.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described our invention, what we claim is:

1. In an attachment for potato picking machines, a supporting frame, an endless conveyer operatively mounted in said frame and adapted to receive and elevate the potatoes and vines lifted by the machine, a series of driven picking rolls revolubly mounted in said frame at the upper end of the conveyer, said rolls being adapted to receive the vines and to separate therefrom any potatoes remaining thereon, means to straighten the vines before passing through said rolls, a hopper to receive the potatoes elevated by the conveyer and a chute connected with said hopper, whereby the potatoes are conducted therefrom into bags or other receptacle provided to receive the same.

2. In an attachment for potato digging machines, a supporting frame secured to the frame of the machine, an endless conveyer operatively mounted in said frame, said conveyer being formed of a series of spaced bars connected together, a series of picking rolls revolubly mounted in the upper end of said frame and spaced a distance from the upper end of the conveyer, said rolls being adapted to receive the vines elevated by the conveyer and to pick therefrom any potatoes remaining thereon, a series of guide rods arranged above the upper end of the conveyer to engage and straighten the vines before the same pass through said rolls, a series of gears to operatively connect said rolls together, a hopper arranged beneath the discharge passage at the upper end of the frame between the conveyer and said rolls, a discharge spout connected with said hopper and adapted to receive a bag, and a truck adapted to be hitched to the machine and drawn along in position to support the bags connected with the discharge spout and hopper of the machine.

In testimony whereof we have hereunto set our hands in presence of two subscribing witnesses.

ELMER L. BOTTS.
DANIEL LUCAS.

Witnesses:
  LEO OBERHAUSER,
  WM. ESPENSON.